United States Patent
Tsuji

(10) Patent No.: US 8,910,306 B2
(45) Date of Patent: Dec. 9, 2014

(54) CONTENT RECORD TERMINAL, CONTENT RECORD/REPRODUCTION SYSTEM, AND CONTENT RECORDING METHOD

(71) Applicant: Panasonic Corporation, Osaka (JP)

(72) Inventor: Hisashi Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 13/652,766

(22) Filed: Oct. 16, 2012

(65) Prior Publication Data

US 2013/0036479 A1  Feb. 7, 2013

Related U.S. Application Data

(63) Continuation of application No. PCT/JP2010/006816, filed on Nov. 22, 2010.

(30) Foreign Application Priority Data

Apr. 28, 2010 (JP) ................. 2010-103361

(51) Int. Cl.
| | | |
|---|---|---|
| G06F 17/30 | (2006.01) | |
| G06F 7/04 | (2006.01) | |
| H04N 7/16 | (2011.01) | |
| H04N 21/472 | (2011.01) | |
| H04N 21/418 | (2011.01) | |
| H04N 21/426 | (2011.01) | |
| H04N 21/8355 | (2011.01) | |
| G06F 11/30 | (2006.01) | |
| G06F 12/14 | (2006.01) | |
| H04N 7/167 | (2011.01) | |
| H04N 5/781 | (2006.01) | |
| H04N 5/907 | (2006.01) | |

(52) U.S. Cl.
CPC ............... *H01N 5/76* (2013.01); *H04N 21/472* (2013.01); *H04N 21/4184* (2013.01); *H04N 21/42661* (2013.01); *H04N 21/8355* (2013.01); *H04N 5/781* (2013.01); *H04N 5/907* (2013.01)
USPC ............... 726/29; 726/26; 713/187; 380/242

(58) Field of Classification Search
CPC . G06F 21/10; G06F 21/6218; H04L 63/0428; H04L 63/08; G11B 20/00086
USPC .......... 713/187–188; 726/22–26, 29; 709/206
See application file for complete search history.

(56) References Cited

U.S. PATENT DOCUMENTS

2005/0076208 A1 *  4/2005  Hori et al. ..................... 713/165
2009/0313663 A1 * 12/2009  Kitazato et al. ................ 725/87

FOREIGN PATENT DOCUMENTS

| JP | 2010-21988 | 1/2010 |
|---|---|---|
| WO | 2008/146913 | 12/2008 |

OTHER PUBLICATIONS

International Search Report issued Mar. 8, 2011 in International Application No. PCT/JP2010/006816.

*Primary Examiner* — Evans Desrosiers
(74) *Attorney, Agent, or Firm* — Wenderoth, Lind & Ponack, L.L.P.

(57) ABSTRACT

When a content write unit records a content on a medium, a control unit controls to record a dummy license which is generated by a dummy license generation unit and an expiration time limit is set into a past time, into the medium. When a recording of the content on the medium is completed, the control unit controls to delete the dummy license recorded on the medium and to record a normal license into the medium.

11 Claims, 8 Drawing Sheets

CONTENT RECORD TERMINAL, CONTENT RECORD/REPRODUCTION SYSTEM, AND CONTENT RECORDING METHOD

CROSS-REFERENCE TO RELATED APPLICATIONS

This application is a continuation application of PCT International Patent Application No. PCT/JP2010/006816 filed Nov. 22, 2010, claiming the benefit of priority of Japanese Patent Application No. 2010-103361 filed Apr. 28, 2010, all of which are incorporated by reference herein in their entirety.

BACKGROUND OF THE INVENTION

1. Field of the Invention

The present invention relates to a content record terminal, a content record/reproduction system, a content recording method and the like for storing a video image content, a sound content or the like in a medium connected to a video image recording terminal.

2. Related Art of the Invention

In recent years, a video image distribution service which uses a communication network (communication line) has spread. In such a video image distribution system which includes a video image distribution server distributing a video image content or the like, a communication network consisting of a network outside a house, such as an Internet, and a network in the house, a video image receiving terminal apparatus connected to the network in the house (hereafter, expressed as a "video image receiving terminal"), and the like, a user can use a VOD (Video On Demand) service, IP (Internet Protocol) broadcasting, a video image download service and the like which are provided from a video image server of a communication enterprise or a video image distribution enterprise, by operating the video image receiving terminal used for viewing the video image.

FIG. 8 shows a diagram for describing processing details of the video image content, in a conventional video image download service.

In a conventional video image download service, as shown in FIG. 8, a video image receiving terminal 200 downloads a video image content from a video image distribution server 210 and stores the content in the built-in HDD 201.

The video image receiving terminal 200 is permitted to reproduce the video image content by a viewing license which is acquired when the video image content is purchased. Then the video image receiving terminal 200 can decrypt and output the video image content stored in the HDD 201. The video image receiving terminal 200 outputs the video image content to a display 202 connected or the like, and the video image content can be viewed. When writing the video image content into another medium is permitted, the video image receiving terminal 200, after decrypting the video image content stored in the HDD 201 and encrypting the decrypted content to export, can also write the video image content into a removable medium 203.

When the video image download service is used, the video image content has to be managed.

For example, the video image distribution server 210 side which distributes the video image content has to recognize whether the video image content has been downloaded correctly or not for permitting the video image receiving terminal 200 to reproduce the video image content. For a video image content in a rental service in which a viewing term is limited, the video image receiving terminal 200 side performs deleting of the video image content promptly when a viewing expiration time limit expires.

As explained above, rights of a service enterprise and a user can be protected by managing the video image content appropriately.

A method, in which the video image distribution server checks a completion of download of the video image content by acquiring another different license from a viewing license from the video image distribution server before the download service is performed for managing the video image content appropriately, is disclosed (see, for example, Patent Document 1 (International Publication No. 2008-146913)).

In the check method of the completion of download of the video image content in the Patent Document 1, first, the different license from the viewing license is acquired before the download of the video image content is started. Since a time short enough is set up as an expiration time limit of the license, the license cannot be used for reproducing the video image content. When the video image receiving terminal completes the download of the video image content, the video image receiving terminal requests to acquire the viewing license to a DRM (Digital Right Management) server of the service enterprise by using the license. The DRM server can recognize the completion of the download of the video image content in the video image receiving terminal by the request to acquire the viewing license.

As described above, a check of the completion of the download of the video image content is realized at the server side.

However, in the above conventional download service, there is a problem that a part that is downloaded of the video image content remains in a recording medium to record in the video image receiving terminal when the download of the video image content is interrupted.

The download of the video image content has a high possibility of being interrupted. External factors such as power discontinuity or internal factors such as starting of another application can be considered as causes of the interruption.

When the download is suddenly interrupted due to such causes, an incomplete video image content which has not been downloaded completely remains in an HDD or a removable medium which is a recording medium in the video image terminal side. Such an incomplete video image content may remain in the recording medium as what is called a garbage file.

Such a garbage file presses the capacity of the recording medium. Furthermore, an opportunity of analyzing the video image content is given to a malicious user or a malicious terminal. The expiration time limit of the license, which is used in the check method of the completion of download of the video image content in the Patent Document 1, is set as a time short enough because the license is used to manage the completion of the download. Therefore, when the expiration time limit of the license expires, some video image receiving terminals delete only the licenses, and so that data of the video image content may remain as it is.

When especially the video image content is recorded on the removable medium, carrying to other terminals is easy and it becomes easy for the malicious user to analyze the video image content.

In view of the above-described conventional problems, it is an object of the present invention to provide a content record terminal, a content record/reproduction system, a content recording method and the like, which can delete a garbage file having the incomplete video image content appropriately even when a recording process of a video image content to a recording medium is interrupted.

SUMMARY OF THE INVENTION

The 1$^{st}$ aspect of the present invention is a content record terminal comprising:

a content write unit which records a content on a medium;

a dummy license generation unit which generates and holds a dummy license where an expiration time limit is set into a past time;

a dummy license record/deletion unit which writes the dummy license into the medium and deletes the dummy license from the medium;

a normal license record unit which writes a normal license for the content into the medium; and a control unit, wherein when the content write unit records the content on the medium, the control unit causes the dummy license record/deletion unit to record the dummy license on the medium, and when the recording of the content on the medium by the content write unit is completed, the control unit causes the dummy license record/deletion unit to delete the dummy license recorded on the medium and causes the normal license record unit to record the normal license on the medium.

The 2$^{nd}$ aspect of the present invention is the content record terminal according to the 1$^{st}$ aspect of the present invention, wherein when the recording of the content on the medium by the content write unit is finished without completing and the control unit causes the content write unit to restart the recording, if a license recorded on a medium to be restarted is the dummy license, the control unit causes the content write unit to continue the recording of the content on the medium, and thereafter when the recording of the content on the medium is completed, the control unit causes the dummy license record/deletion unit to delete the dummy license recorded on the medium and causes the normal license record unit to record the normal license on the medium.

The 3$^{rd}$ aspect of the present invention is the content record terminal according to the 1$^{st}$ aspect of the present invention, further comprising a content deletion unit which deletes the content recorded on the medium, wherein when the recording of the content on the medium by the content write unit is finished without completing and the control unit causes the content write unit to restart the recording, if a license recorded on a medium to be restarted is not the dummy license, the control unit causes the content deletion unit to delete the content recorded on the medium and causes the dummy license record/deletion unit to delete the license recorded on the medium.

The 4$^{th}$ aspect of the present invention is the content record terminal according to the 2$^{nd}$ aspect of the present invention, further comprising a content deletion unit which deletes the content recorded on the medium, wherein when the recording of the content on the medium by the content write unit is finished without completing and the control unit causes the content write unit to restart the recording, if a license recorded on a medium to be restarted is not the dummy license, the control unit causes the content deletion unit to delete the content recorded on the medium and causes the dummy license record/deletion unit to delete the license recorded on the medium.

The 5$^{th}$ aspect of the present invention is the content record terminal according to the 1$^{st}$ aspect of the present invention, wherein the dummy license where the expiration time limit is set into the past time, includes information to identify the content record terminal.

The 6$^{th}$ aspect of the present invention is the content record terminal according to the 2$^{nd}$ aspect of the present invention, wherein the dummy license where the expiration time limit is set into the past time, includes information to identify the content record terminal.

The 7$^{th}$ aspect of the present invention is the content record terminal according to the 3$^{rd}$ aspect of the present invention, wherein the dummy license where the expiration time limit is set into the past time, includes information to identify the content record terminal.

The 8$^{th}$ aspect of the present invention is the content record terminal according to the 4$^{th}$ aspect of the present invention, wherein the dummy license where the expiration time limit is set into the past time, includes information to identify the content record terminal.

The 9$^{th}$ aspect of the present invention is the content record terminal according to the 1$^{st}$ aspect of the present invention, further comprising a license save unit which acquires the normal license at least before a start of the recording of the content on the medium and holds the normal license until being recorded on the medium.

The 10$^{th}$ aspect of the present invention is the content record terminal according to the 1$^{st}$ aspect of the present invention, further comprising a content acquisition unit which acquires the content through a network when the content is recorded on the medium, wherein the medium is a non-exchangeable medium built in the content record terminal.

The 11$^{th}$ aspect of the present invention is the content record terminal according to the 1$^{st}$ aspect of the present invention, wherein the medium is an exchangeable recording medium.

The 12$^{th}$ aspect of the present invention is a content record/reproduction system comprising a content record terminal and a content reproduction terminal, wherein the content record terminal includes:

a content write unit which records a content on a medium;

a dummy license generation unit which generates and holds a dummy license by which an expiration time limit is set to a past time;

a dummy license record/deletion unit which writes the dummy license into the medium and deletes the dummy license on the medium;

a normal license record unit which writes a normal license for the content into the medium; and a control unit which (i) causes the dummy license record/deletion unit to record the dummy license on the medium when the content write unit records the content on the medium, and (ii) causes the dummy license record/deletion unit to delete the dummy license recorded on the medium and causes the normal license record unit to record the normal license on the medium when the recording of the content on the medium by the content write unit is completed, and the content reproduction terminal includes:

a content read/deletion unit which reads out a content and a license recorded on the medium, and deletes a content and a license recorded on the medium;

an expiration time limit judgment unit which judges whether the expiration time limit of the license read by the content read/deletion unit is exceeded; and a reproduction control unit which (i) reproduces the content recorded on the medium when the expiration time limit of the read license is not exceeded, and (ii) causes the content read/deletion unit to delete the content and the license recorded on the medium when the expiration time limit of the read license is exceeded.

The 13$^{th}$ aspect of the present invention is a content recording method of a content record terminal which records a content on a medium, the content recording method comprising:

a content write step of recording the content on the medium;

a dummy license generation step of generating a dummy license where an expiration time limit is set into a past time;

a dummy license record step of recording the dummy license on the medium when the content is recorded on the medium; and a license record step of deleting the dummy license recorded on the medium and recording a normal license for the content on the medium, when the recording of the content on the medium is completed.

The 14$^{th}$ aspect of the present invention is the content recording method according to the 13$^{th}$ aspect of the present invention, further comprising a content record continuation step, wherein when the recording of the content on the medium is finished without completing and the recording is restarted, if a license recorded on a medium to be restarted is the dummy license, the content record continuation step includes continuing the recording of the content on the medium, and thereafter when the recording of the content on the medium is completed, the content record continuation step includes deleting the dummy license recorded on the medium and recording the normal license on the medium.

The 15$^{th}$ aspect of the present invention is the content recording method according to the 14$^{th}$ aspect of the present invention, wherein when the recording of the content on the medium is finished without completing and the recording is restarted, if the license recorded on the medium to be restarted is not the dummy license, the content record continuation step includes deleting the content and the license recorded on the medium.

The 16$^{th}$ aspect of the present invention is a non-transitory computer-readable medium having a program stored thereon, wherein the program causes a computer to execute the content recording method according to the 13$^{th}$ aspect of the present invention.

The present invention can provide a content record terminal, a content record/reproduction system, a content recording method and the like which can delete a garbage file having the incomplete video image content appropriately even when a recording process of a video image content to a recording medium is interrupted.

DESCRIPTION OF SYMBOLS

Figure 1:
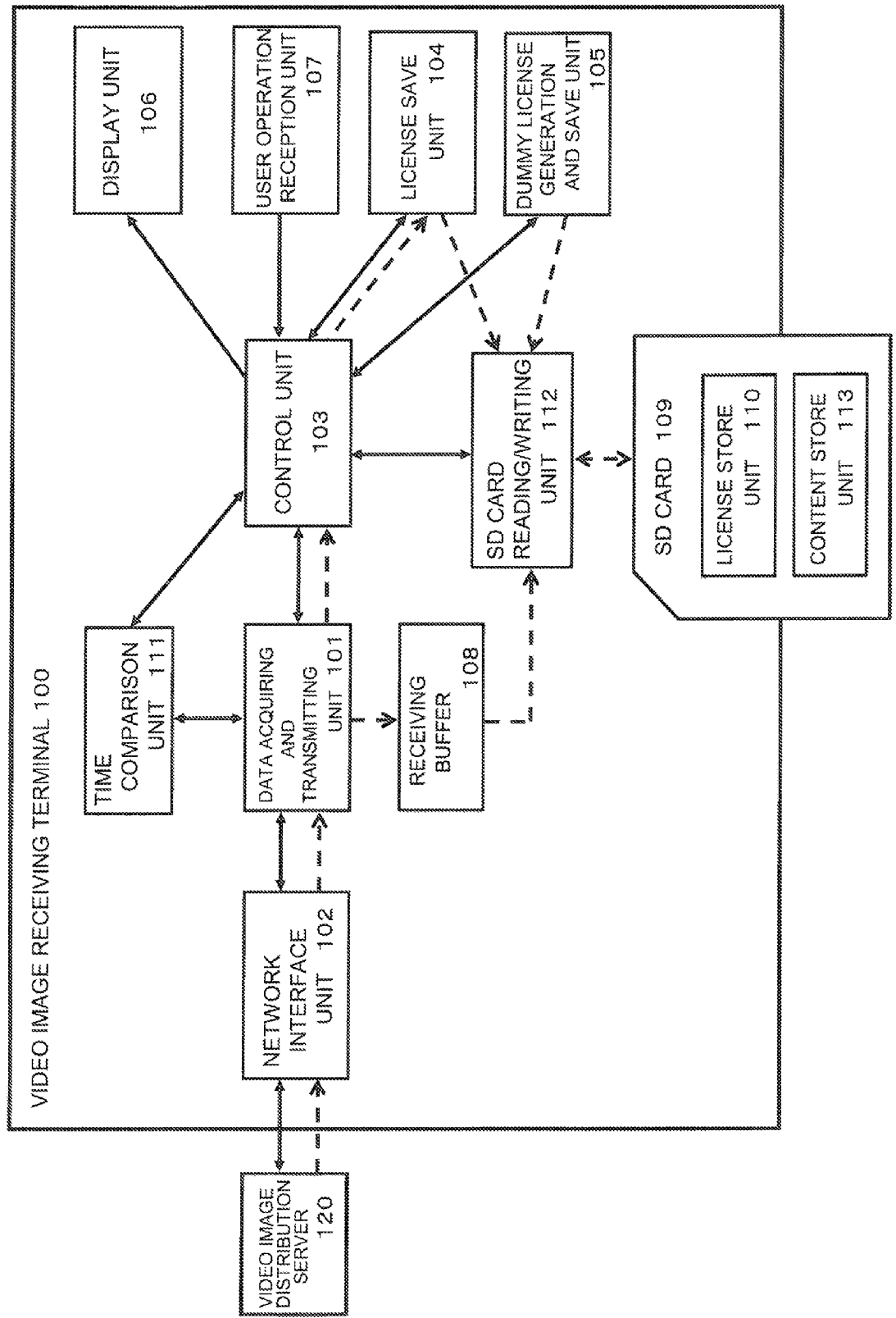
FIG. 1 is a block diagram showing a configuration of a video image receiving terminal according to a first embodiment of the present invention.

100 Video image receiving terminal
101 Data acquiring and transmitting unit
102 Network interface unit
103 Control unit
104 License save unit
105 Dummy license generation and save unit
106 Display unit
107 User operation reception unit
108 Receiving buffer
109 SD card
110 License store unit
111 Time comparison unit
112 SD card reading/writing unit
113 Content store unit
120 Video image distribution server
130 Video image content name
131 Video image content detail
132 Video image content download execution button
140 Video image reproduction terminal
141 Reproduction control unit
142 SD card reading/writing unit
143 Time comparison unit
144 Display unit
145 User operation reception unit
200 Video image receiving terminal
201 HDD
202 Display
203 Removable medium
210 Video image distribution server
301 Download request content selection instruction
302 Content detail screen acquisition request
303 Content detail screen generation
304 Content detail screen response
305 Display of content detail screen
306 Download execution request
307 Content download request
308 Content purchase decision processing
309 Content download response
0310 Normal license transfer
311 Dummy license generation
312 Dummy license store 313 Content data download
314 Content export
315 Normal license writing

PREFERRED EMBODIMENTS OF THE INVENTION

Embodiments of the present invention are described below with reference to the drawings.

First Embodiment

FIG. 1 is a block diagram showing a configuration of a video image receiving terminal in a content utilization system according to a first embodiment of the present invention.

In FIG. 1, the video image receiving terminal 100 according to the first embodiment comprises a data acquiring and transmitting unit 101, a network interface unit 102, a control unit 103, a license save unit 104, a dummy license generation and save unit 105, a display unit 106, a user operation reception unit 107, a receiving buffer 108, a time comparison unit 111, and an SD card reading/writing unit 112. The video image receiving terminal 100 has a function of deleting appropriately a garbage file on a recording medium (an SD card 109) when a download is interrupted.

The SD card 109 is inserted in the video image receiving terminal 100. The video image receiving terminal 100 records a video image content, a license, and the like on the SD card 109, and reads them out from the SD card 109.

The video image content which is downloaded and recorded in the video image receiving terminal 100 corresponds to an example of a content according to the present invention. The video image receiving terminal 100 corresponds to an example of a content record terminal according to the present invention. The data acquiring and transmitting unit 101 corresponds to an example of a content acquisition unit according to the present invention. The dummy license generation and save unit 105 corresponds to an example of a dummy license generation unit according to the present invention. The SD card reading/writing unit 112 controlled by the control unit 103 corresponds to an example of each of a content write unit, a dummy license record/deletion unit and a normal license record unit according to the present invention. The SD card 109 corresponds to an example of an exchangeable recording medium according to the present invention.

The video image receiving terminal 100 is a video image receiving terminal having a function of downloading or exporting a video image content, which is provided by a communication enterprise or a video image distribution enterprise in the download service or is stored in the video image receiving terminal, to a recording medium. As such a video image receiving terminal 100, a digital television, a set top box, a personal computer or the like can be considered. But the video image receiving terminal 100 is not limited to any of these.

In FIG. 1, an arrow shown with a dashed line shows a flow of data of the video image content, the license or the like. An arrow shown with a solid line shows a flow of information such as control information other than the data.

The network interface unit 102 is connected to a video image distribution server 120 provided by the communication enterprise or the video image distribution enterprise, through an external communication network.

The data acquiring and transmitting unit 101 receives an HTML content, the video image content and the license related with the video image content, which are transmitted from the video image distribution server 120, through the network interface unit 102. And the data acquiring and transmitting unit 101 transmits the data directed by the control unit 103 to the video image distribution server 120 through the network interface unit 102.

The control unit 103 performs control of each operation in the video image receiving terminal 100.

The license save unit 104 stores the license which is transmitted from the video image distribution server 120 through the network interface unit 102 and is related with the video image content.

The dummy license generation and save unit 105, according to a request from the control unit 103, generates and holds a dummy license which is different from the license stored in the license save unit 104 and cannot be used to reproduce the video image content.

The display unit 106 displays the data which has been requested to be displayed by the control unit 103, and shows the data to the user.

The user operation reception unit 107 accepts a request to download a video image content or a request to acquire detail information of the video image content from the outside, for example, with an operation of a remote controller by the user. And the user operation reception unit 107 transmits, to the control unit 103, the accepted request to download the video image content or the accepted request to acquire detail information of the video image content.

The receiving buffer 108 is a buffer which temporarily records data of the video image content being downloaded. A RAM or the like is used as the receiving buffer 108.

The time comparison unit 111 has a function of acquiring a present time. The time comparison unit 111 compares the expiration time limit of the license with the present time and judges whether the license is valid or invalid.

The SD card reading/writing unit 112, according to a request from the control unit 103, writes and deletes data of the video image content, the license or the like on the SD card 109 which is inserted in the video image receiving terminal 100.

The video image content is stored on the content store unit 113 in the SD card 109. The license related with the video image content which is stored in the SD card 109 and the dummy license are stored on the license store unit 110.

Next, an execution process of a download method of the video image content in the video image receiving terminal 100 is described.

As an example of the execution process in the first embodiment, a case of a direct export process in which the video image content downloaded by the video image terminal 100 is recorded directly on the SD card 109 inserted in the video image terminal 100 is described.

The video image content which is downloaded from the video image distribution server 120 is encrypted by DRM. In order to record the video image content into the SD card 109, the code of DRM is decrypted, the video image content is re-encrypted in such CPRM form which is CPS for the SD card, and the video image content which has been re-encrypted is recorded into the SD card 109. In FIG. 1, descriptions of processes of decrypting and re-encrypting are omitted.

First, a download method of the video image content on the video image receiving terminal 100 is described using FIGS. 1 to 4.

Figure 2:
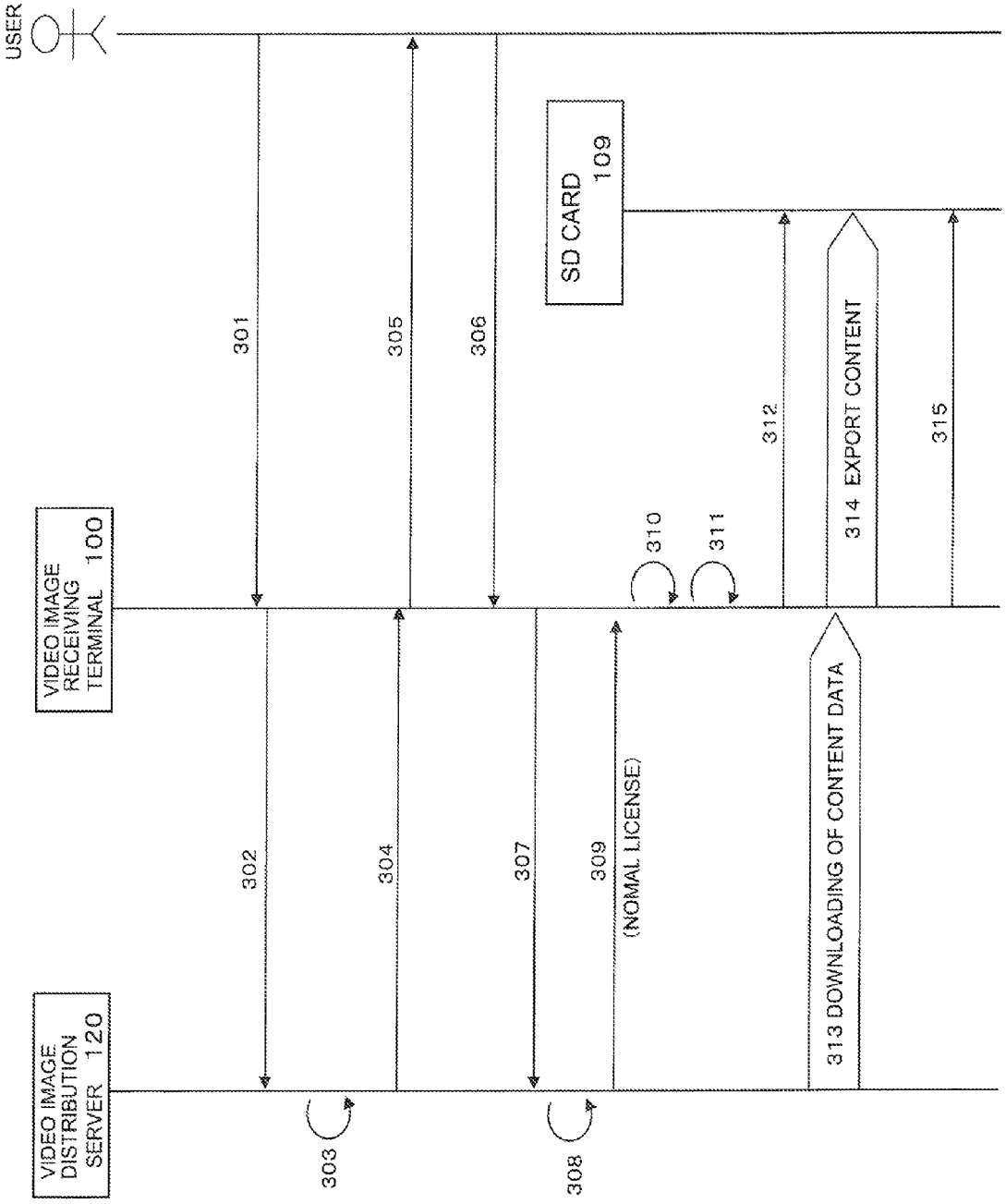
FIG. 2 is a diagram showing an operation and a communication sequence, in the video image receiving terminal and a video image distribution server at the time of downloading a video image content, according to the first embodiment of the present invention.

FIG. 2 shows an operation and a communication sequence, in the video image receiving terminal 100 and the video image distribution server 120 at the time of downloading the video image content.

Figure 3:
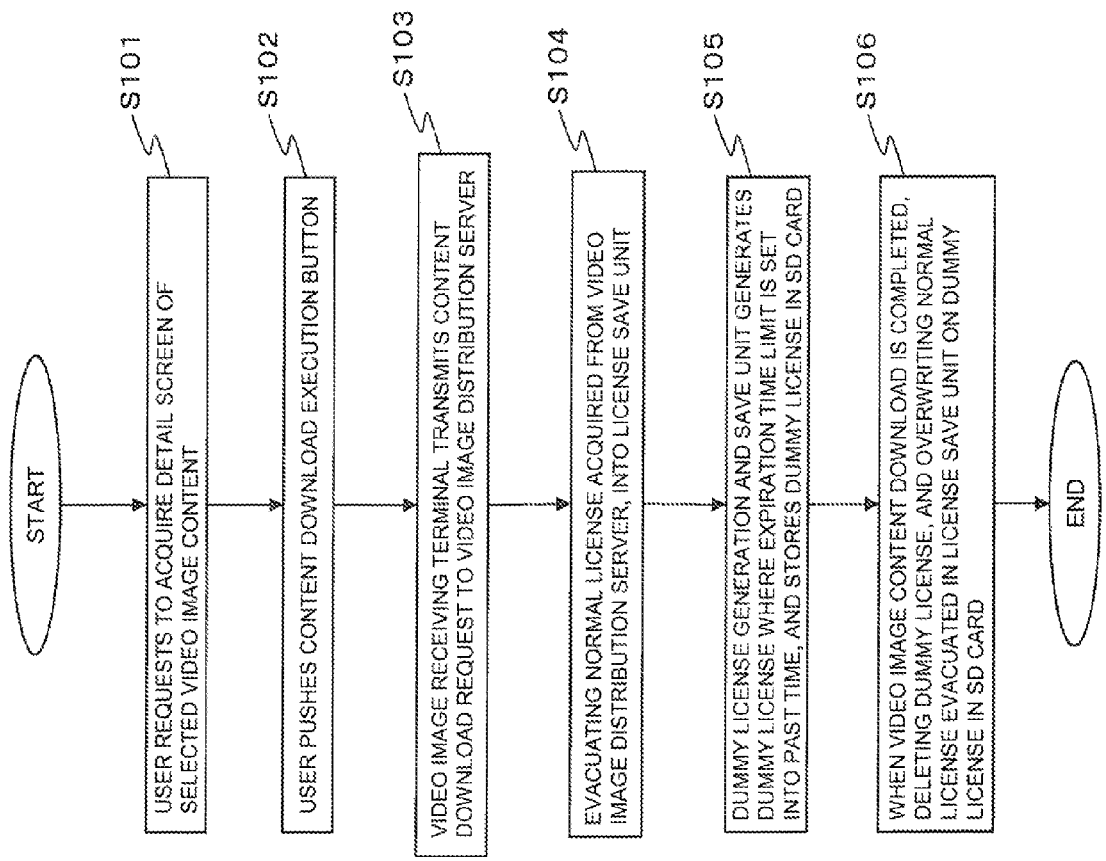
FIG. 3 is a flowchart showing a process which downloads the video image content in the video image receiving terminal according to the first embodiment of the present invention.

FIG. 3 is a flowchart showing a process which downloads the video image content in the video image receiving terminal 100.

Figure 4:
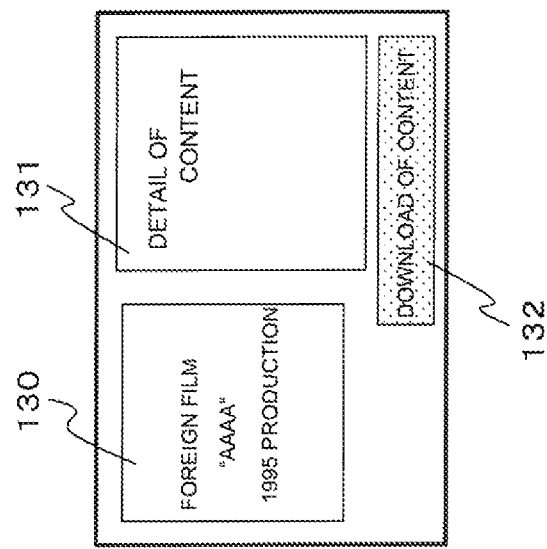
FIG. 4 is a diagram showing an example of a display of a detail screen for the video image content according to the first embodiment of the present invention.

FIG. 4 shows an example of a display of a screen which shows details of the video image content displayed by the display unit 106 at the time of downloading the video image content. HTML data is received from the video image distribution server 120, for example, with an operation of the remote controller by the user. The control unit 103 makes the display unit 106 display this screen shown in FIG. 4, according to the HTML data.

The user views a display to select a video image content provided by the video image distribution server 120, which is displayed by the display unit 106, and the user operates to acquire a detail screen for the video image content to be requested. Thus the user operation reception unit 107 receives a download request content selection instruction 301 from the user and transmits it to the control unit 103. The control unit 103 makes the data acquiring and transmitting unit 101 transmit a content detail screen acquisition request 302 to the video image distribution server 120. The video image distribution server 120 generates the content detail screen for the corresponded video image content (see 303 in FIG. 2) according to the content detail screen acquisition request 302, and transmits the content detail screen as a content detail screen response 304 to the video image receiving terminal 100. When the control unit 103 in the video image receiving terminal 100 acquires the content detail screen response 304 from the data acquiring and transmitting unit 101, the control unit 103 makes the display unit 106 display the content detail screen as shown in FIG. 4 (step S101).

The user checks information of the video image content such as an outline of the video image content or a price of the video image content according to such as a video image content name 130 or a video image content detail 131 shown in FIG. 4, and the user pushes a video image content download execution button 132 on the screen (step S102).

Next, the user operation reception unit 107 receives a download execution request 306 of the video image content from the user, and transmits it to the control unit 103. The control unit 103 makes the data acquiring and transmitting unit 101 transmit a content download request 307 to the video image distribution server 120 (step S103). The video image distribution server 120 performs a content purchase decision processing 308 according to the content download request 307.

The video image distribution server 120 transmits the video image content and the license related with the video image content, to the video image receiving terminal 100.

First, the video image distribution server 120 returns a content download response 309 corresponding to the content download request 307 from the video image receiving terminal 100. At this time, the video image distribution server 120 returns the license, with the content download response 309. In order to simplify the following description, this license will be called "a normal license". The control unit 103 in the video image receiving terminal 100 which received the content download response 309 transfers the normal license received from the data acquiring and transmitting unit 101, to the license save unit 104 (see normal license transfer 310 in FIG. 2) (step S104).

The control unit 103 transmits a dummy license generation request to the dummy license generation and save unit 105. The dummy license generation and save unit 105 generates a dummy license according to the dummy license generation request received from the control unit 103 (see dummy license generation 311). At this time, an expiration time limit of the dummy license to be generated is set as the time before the present time.

The dummy license generation and save unit 105 holds the generated dummy license in the dummy license generation and store unit 105 and stores the generated dummy license into the license store unit 110 by the SD card reading/writing unit 112 (see dummy license store 312 in FIG. 2) (step S105). The dummy license includes information such as a terminal ID by which the video image receiving terminal is discriminated from other terminal.

The data of the video image content received from the video image distribution server 120 by a content data download 313 is exported to the SD card 109 through the receiving buffer 108 by the SD card reading/writing unit 112 (see content export 314 in FIG. 2), and is stored into the content store unit 113 in the SD card 109.

When the download of the video image content is completed, the control unit 103 writes the normal license which has been transferred to the license save unit 104 into the license store unit 110 in the SD card 109 (see normal license writing 315 in FIG. 2). Therefore, the dummy license is overwritten by the normal license. And the control unit 103 deletes the dummy license which has been held in the dummy license generation and save unit 105 (step S106).

By the above processing, the video image content is downloaded from the video image distribution server 120 and is recorded on the SD card 109.

In the above, the normal license is acquired from the video image distribution server 120 when the download of the video image content is started. The normal license may be acquired in advance before the video image content is started to record into the SD card 109, at such timing just after the purchase of the video image content.

In the above, the normal license is acquired from the video image distribution server 120. The normal license can be acquired by other method such that the normal license is read from a removable medium.

Next, a process, in which the video image content written out to the SD card 109 by the video image receiving terminal 100 as described above is brought out and is reproduced at another video image reproduction terminal such as a portable terminal, is described.

Figure 5:
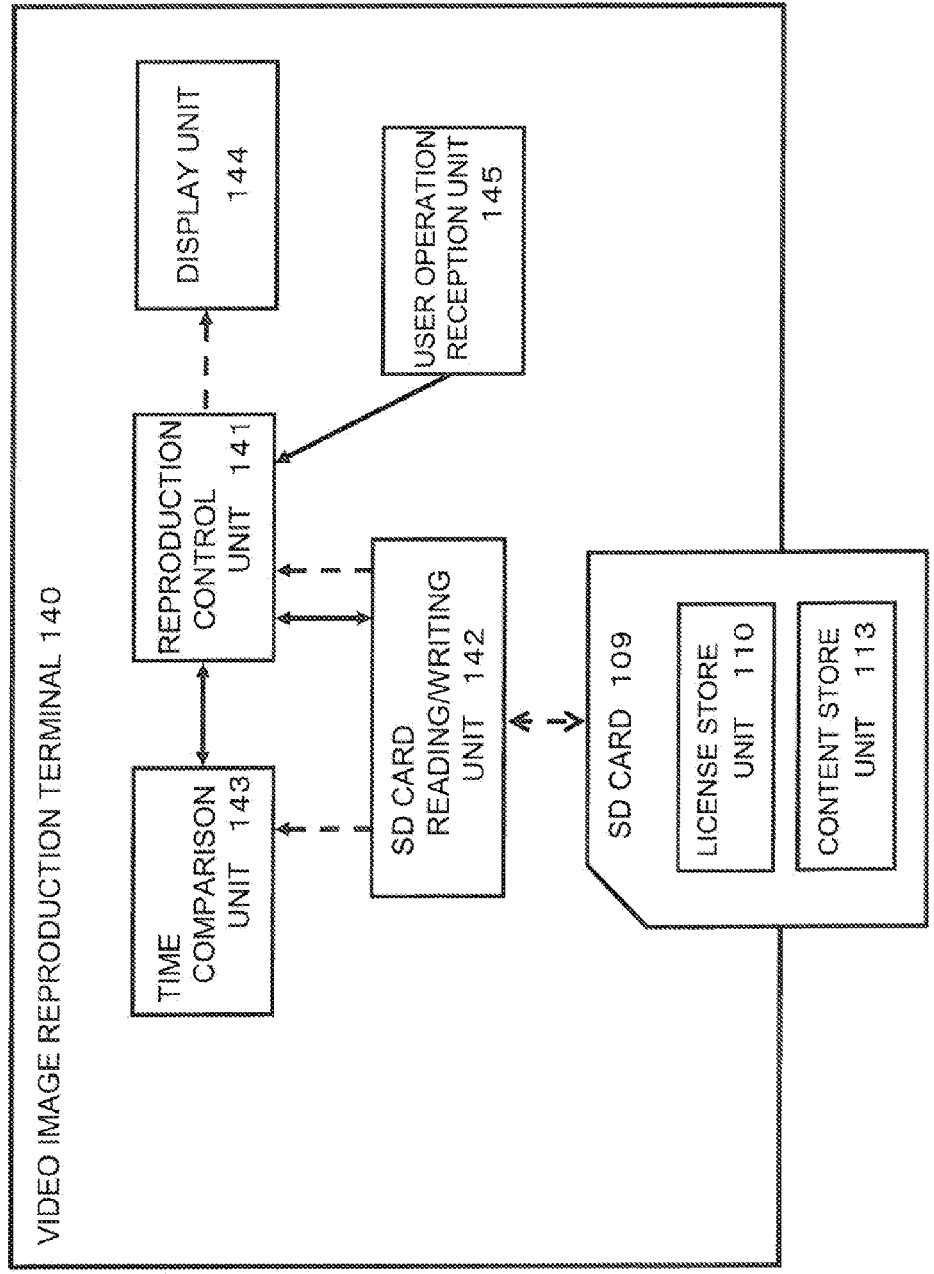
FIG. 5 is a block diagram showing a configuration of a video image reproduction terminal according to the first embodiment of the present invention.

FIG. 5 is a block diagram showing a configuration of the video image reproduction terminal such as the portable terminal which reproduces the video image content stored in the SD card 109. The composition of the video image reproduction terminal 140 shown in FIG. 5 is not peculiar to this patent application. The video image reproduction terminal 140 is a conventional video image reproduction terminal which has a general composition and is used from before.

In FIG. 5 like FIG. 1, an arrow shown with a dashed line shows a flow of data of the video image content, the license or the like. An arrow shown with a solid line shows a flow of information such as control information other than the data.

When the video image reproduction terminal 140 reproduces the video image content, the reproduction control unit 141 controls the reproduction.

The display unit 144 displays the reproduced data of the video image content outputted from the reproduction control unit 141, and shows the data to the user.

The user operation reception unit 145 accepts an instruction to display a list of the video image contents or an instruction to reproduce the selected video image content, for example, with an operation of buttons by the user. And the user operation reception unit 145 transmits the instruction information which is accepted from the user, to the reproduction control unit 141.

The time comparison unit 143 has a function of acquiring a present time. The time comparison unit 143 compares the expiration time limit of the license with the present time and judges whether the license is valid or invalid.

The SD card reading/writing unit 142, according to a request from the reproduction control unit 141, reads and deletes data of the video image content, the license or the like on the SD card 109 which is inserted in the video image reproduction terminal 140.

The video image reproduction terminal 140 corresponds to an example of a content reproduction terminal according to the present invention. The SD card reading/writing unit 142 corresponds to an example of a content read/deletion unit according to the present invention. The time comparison unit 143 corresponds to an example of an expiration time limit judgment unit according to the present invention.

Figure 6:
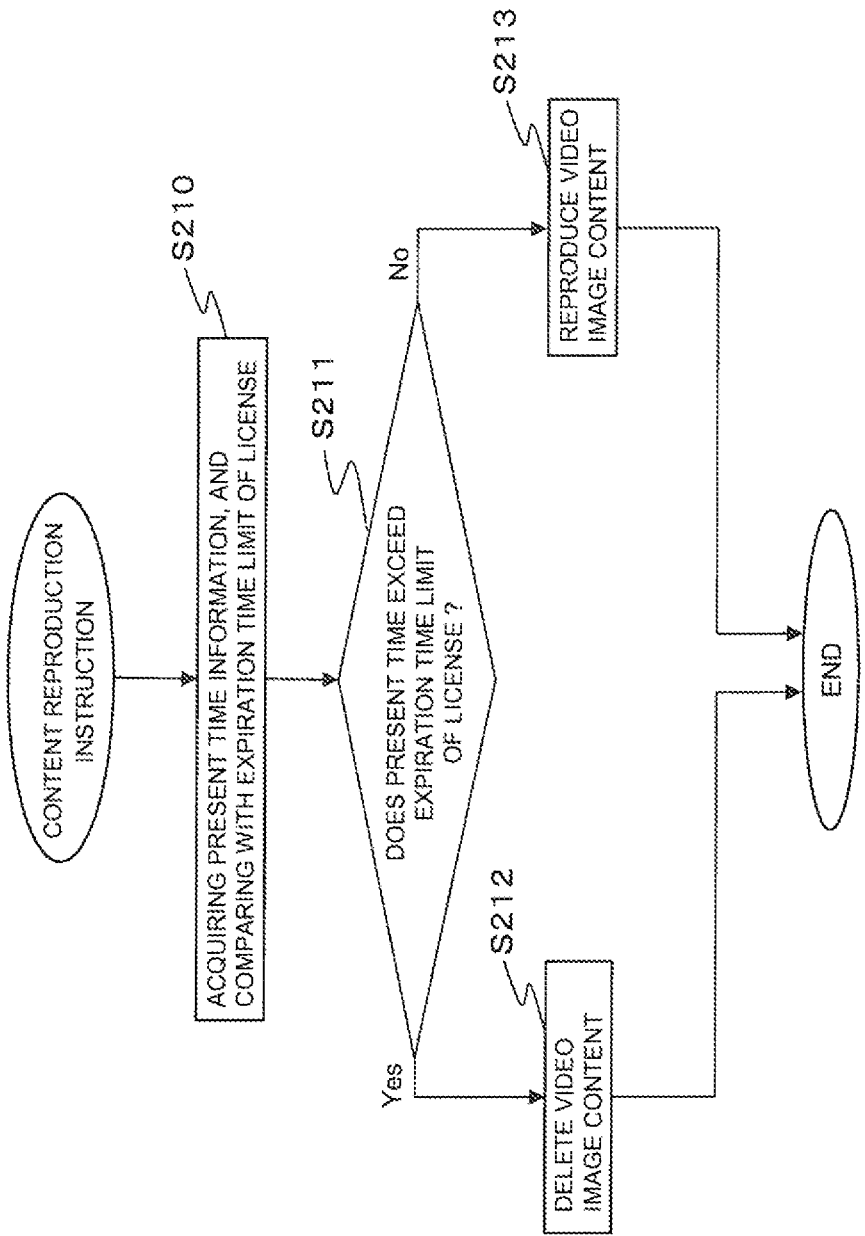
FIG. 6 is a flowchart of a license judgment process in the video image reproduction terminal at the time of receiving an instruction of reproduction according to the first embodiment of the present invention.

Next, a reproduction method of the video image content stored on the SD card 109 at the video image reproduction terminal 140 is described using FIGS. 5 and 6.

FIG. 6 is a flowchart which judges whether the license of the video image content is valid or invalid when the reproduction instruction for the video image content stored in the content store unit 113 in the SD card 109 is accepted with such as the operation of buttons by the user.

When the user operation reception unit 145 accepts the reproduction instruction for the video image content stored in the SD card 109 from the user, the user operation reception unit 145 notifies to the reproduction control unit 141. The reproduction control unit 141 notified from the user operation reception unit 145 refers to the license related with the video image content stored in the content store unit 113 from the license store unit 110, and requests a comparison of the expiration time limit of the license to the time comparison unit 143 (step S210).

The time comparison unit 143 acquires a present time and checks whether the expiration time limit of the license acquired from the license store unit 110 has expired.

When the present time exceeds the expiration time limit of the license at step S211, the reproduction control unit 141 causes the SD card reading/writing unit 142 to delete the video image content corresponding to the license on the content store unit 113 (step S212). At this time, the reproduction control unit 141 causes the SD card reading/writing unit 142 to also delete the license which is stored in the license store unit 110 and the expiration time limit of which has expired.

When the present time does not exceed the expiration time limit of the license at step S211, the reproduction control unit 141 reproduces the video image content normally and causes the display unit 144 to display (step S213).

Figure 7:
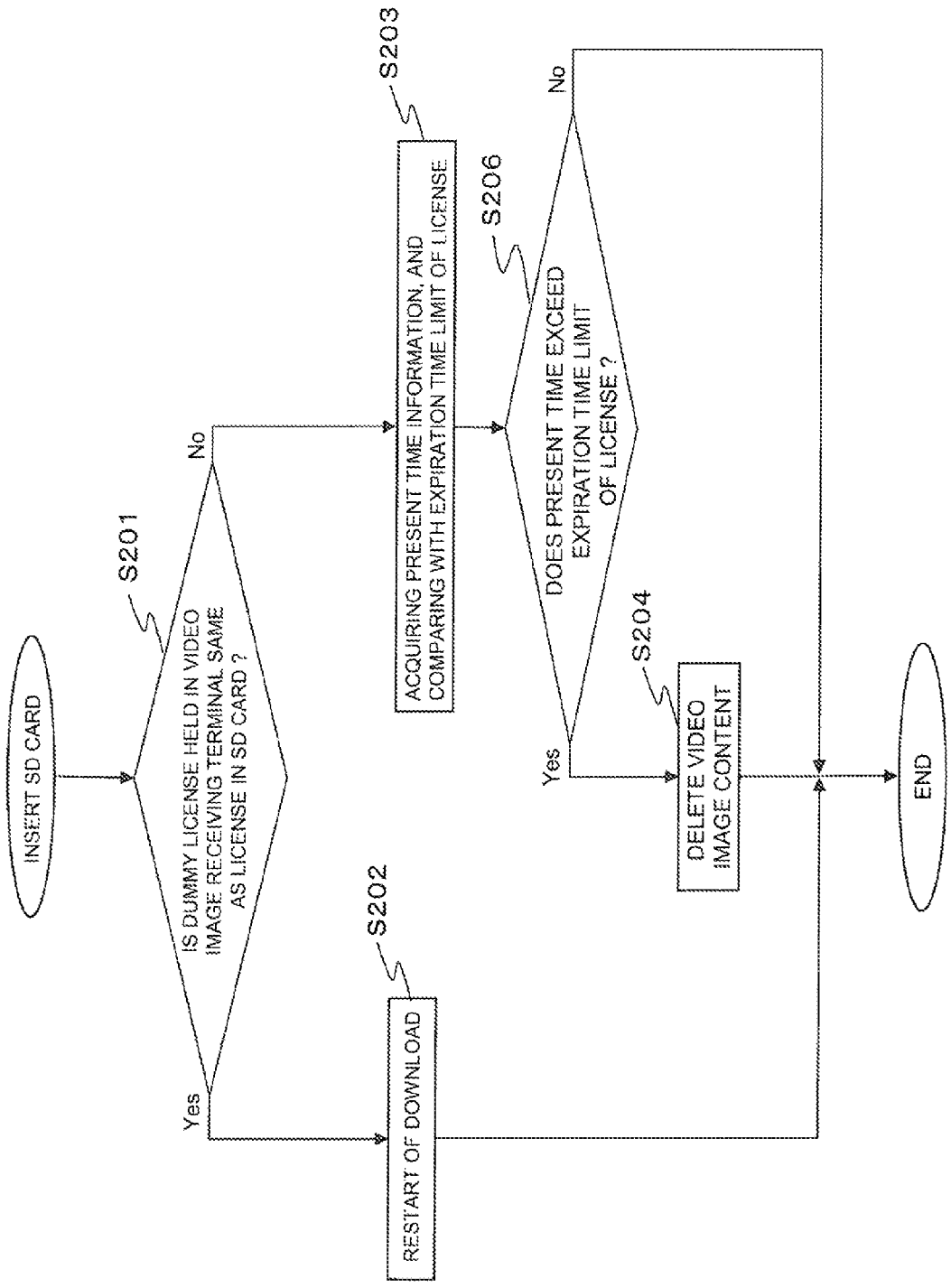
FIG. 7 is a flowchart showing a process which judges whether a content in an SD card is on downloading in the video image receiving terminal according to the first embodiment of the present invention.
Figure 8:
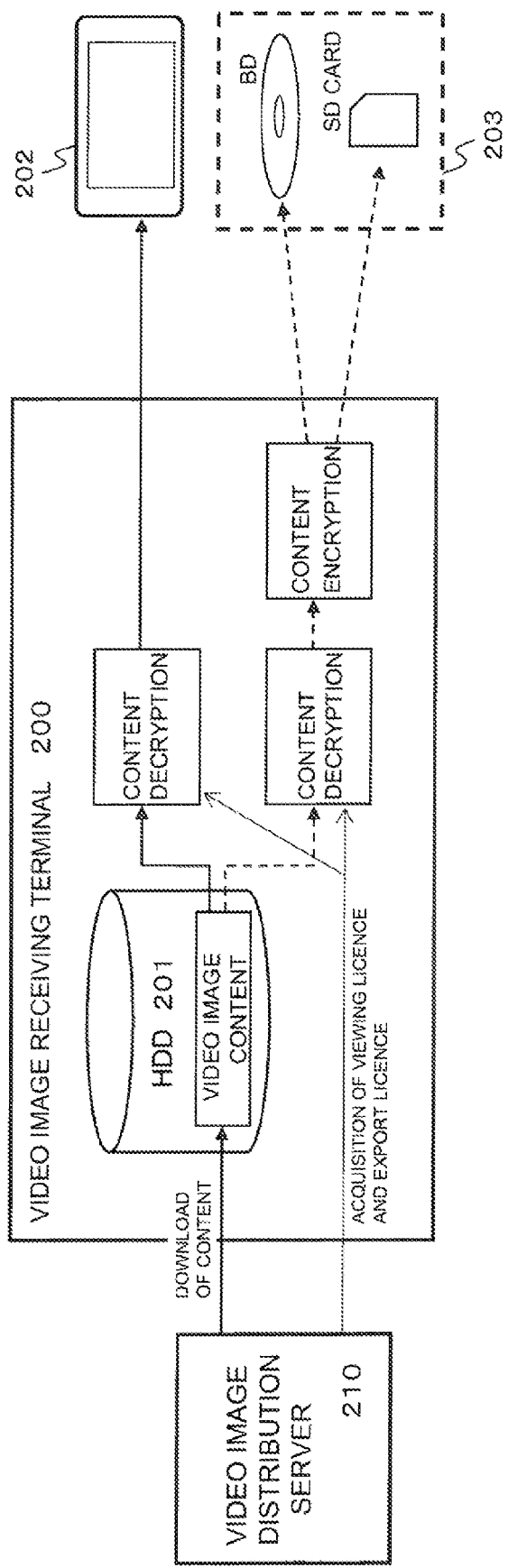
FIG. 8 is a diagram to describe an outline of a processing for a video image content on a conventional video image download service.

Next, a deletion method of the unnecessary video image content and a continuation method of the download when the download is interrupted while exporting the video image content to the SD card 109 at the video image receiving terminal 100, are described using FIGS. 1 and 7.

The case that the download of the video image content is interrupted is such a case as a processing is interrupted during executing a content export 314 shown in FIG. 2. The case is a state where the processing of step S106 is not performed yet after the processing of step S105 shown in FIG. 3.

Since the download is interrupted, a part data of the video image content being downloaded is stored in the content store unit 113 in the SD card 109. And at this time, the dummy license is stored in the license store unit 110 and in the dummy license generation and save unit 105 respectively.

FIG. 7 is a flowchart which judges whether the video image content stored in the content store unit 113 in the SD card 109 in the video image receiving terminal 100 is a video image content being downloaded or a video image content of which the license is valid.

When the SD card 109 is inserted in the video image receiving terminal 100, the control unit 103 refers to the license related with the video image content stored in the content store unit 113 from the license store unit 110. The control unit 103 checks whether the license acquired from the license store unit 110 is also stored in the dummy license generation and save unit 105 (step S201).

When the same license is stored in the dummy license generation and save unit 105, that is, when the license acquired from the license store unit 110 is the dummy license recorded by the video image receiving terminal 100, the control unit 103 judges that the video image content stored in the content store unit 113 is a content that is in the process of being downloaded from the video image receiving terminal 100. The control unit 103 controls to restart the download of the video image content and to continue the recording the data of the video image content into the content store unit 113 (step S202).

When the same dummy license as the license acquired from the license store unit 110 is not stored in the dummy license generation and save unit 105 at step S201, the control unit 103 requests a comparison of the expiration time limit of the license to the time comparison unit 111 (step S203).

The time comparison unit 111 acquires a present time and checks whether the expiration time limit of the license acquired from the license store unit 110 has expired. As an acquiring method of the present time, accessing to a NTP (Network Time Protocol) server, acquiring TOT from a digital broadcasting or the like can be considered. But the acquiring method of the present time is not limited to any of these.

When the present time exceeds the expiration time limit of the license at step S206, the control unit 103 causes the SD card reading/writing unit 112 to delete the video image content corresponding to the license on the content store unit 113 (step S204). At this time, the control unit 103 causes the SD card reading/writing unit 112 to also delete the license which is stored in the license store unit 110 and the expiration time limit of which has expired.

The video image content having the license the expiration time limit of which has expired includes the video image content provided in the rental service, the expiration time limit of the license of which expired normally, and the incomplete video image content which has not been recorded completely yet into the content store unit 113 because the download is interrupted as described above. That is, after starting the download and until completing the download, the dummy license where the expiration time limit is set into the past time is stored in the license store unit 110 (step S105). Therefore, when the control unit 103 refers to the license corresponding to the video image content which has not been recorded completely into the content store unit 113, the dummy license is read out, and the control unit 103 judges that the expiration time limit of the dummy license has expired.

About the video image content which is under recording at a terminal other than the video image receiving terminal 100, that is about the unnecessary video image content in the video image receiving terminal 100, it is judged that the expiration time limit has expired. When the control unit 103 only judges whether the expiration time limit of the license expires or not at step S206, it can be judged that the video image content which is under recording at a terminal other than the video image receiving terminal 100 is an unnecessary video image content the expiration time limit of which has expired.

Therefore, at step S206, the control unit 103 deletes the video image content which is judged that the expiration time limit expires from the content store unit 113 (step S204). Then, the unnecessary video image content which has not been recorded completely at a terminal other than the video image receiving terminal 100 is also deleted.

When the present time does not exceed the expiration time limit of the license at step S206, the control unit 103 judges that the video image content is "a valid video image content", and ends the process.

In the above, the case of judging whether the video image content which is stored in the content store unit 113 in the SD card 109 is a video image content in the process of being downloaded when the SD card 109 is inserted into the video image receiving terminal 100, is described. When the video image receiving terminal 100 accepts a reproduction instruction of the video image content which is stored in the content store 113 in the SD card 109, it can be judged whether the video image content is a video image content in the process of being downloaded. In this case, the same processing as the flow shown in FIG. 7 is performed. When the present time does not exceed the expiration time limit of the license at step S206, that is when judged as "No" at step S206, the control unit 103 controls to reproduce the video image content normally.

Furthermore, when a state where the download is interrupted is canceled, it can be judged whether the video image content is a video image content in the process of being downloaded. For example, when the download is interrupted by power discontinuity, the check can be performed at the time the power supply is switched on again. When the download is interrupted due to starting of another application, the check can be performed at the time a CPU load of the video image receiving terminal has become less than a predetermined value.

When the SD card 109 in which the unnecessary video image content in the process of being recorded is stored is inserted into the video image reproduction terminal 140, the unnecessary video image content is also deleted by a process which judges of "valid or invalid" of the video image content shown in FIG. 6 and is provided in the conventional video image reproduction terminal 140.

When the video image reproduction terminal 140 accepts a reproduction instruction of the video image content which is stored in the content store 113 in the SD card 109, if the video image content is in the process of being recorded, the time comparison unit 143 compares the expiration time limit of the dummy license stored in the license store unit 110 with the present time at step S210 in FIG. 6. Since the expiration time limit of the dummy license is set as the past time, it is judges that the present time exceeds the expiration time limit at step S211. As a result, the unnecessary video image content in the process of being recorded which is stored in the SD card 109 is deleted (step S212).

In the above, the process shown in FIG. 6 is performed when the reproduction instruction of the video image content is accepted. When the SD card 109 is inserted into the video image reproduction terminal 140, the same processes as the processes other than the video image content reproduction (step S213), that is processes of step S210 to S212, can be performed, and the video image content which is judged that the expiration time limit expires can be deleted.

In the above, data of the video image content in the process of being recorded which is a garbage file can be deleted by the function of the conventional video image reproduction terminal 140 such as a portable terminal which is brought out and reproduces the video image content in a removable medium such as the SD card 109.

By the above process, the garbage file such as the video image content in the process of being recorded which remains on the SD card 109 by ending the download at another terminal is deleted automatically at the video image receiving terminal 100 and the video image reproduction terminal 140. Therefore, the problem that the garbage file remains is solvable.

In the first embodiment, the case of downloading the video image content which is stored in the video image distribution server 120 and exporting the video image content directly to the SD card 109 inserted in the video image receiving terminal 100, is described. The present invention can be applied to the case that the video image content stored in the video image receiving terminal 100 is exported to the removable medium such as the SD card 109. The present invention can also be applied to the case that the video image content stored in the video image distribution server 120 is downloaded and is recorded in a fixed medium such as an HDD built in the video image content receiving terminal 100.

In the first embodiment, the SD card 109 is used as an example of an exchangeable recording medium according to the present invention. A memory card other than the SD card, a DVD, a Blu-ray Disc or other exchangeable medium can be used.

As described above, by using the present invention, the unnecessary video image content which remains when the download of the video image content is interrupted can be deleted appropriately. Therefore, the pressure for capacity of the memory medium can be cancelled, and the data analyzing by the malicious user or the malicious terminal can be prevented.

The configuration of the present invention may be realized in terms of software or may be realized in terms of hardware.

When the functions of the control unit 103, the dummy license generation and save unit 105 and the like are performed by software which executes a program by using a CPU, a change of a format of the data received from the server, a change of a format of the license, an addition of a video image content with a new form, etc. can be supported easily compared with the changes concerning those functions performed by hardware.

The non-transitory computer-readable medium of the present invention is a recording medium having recorded thereon a program of the content recording method of the present invention and is a recording medium the program of which, when read, is used in cooperation with the computer.

The content record terminal, the content record/reproduction system, the content recording method and the like according to the present invention have an effect which can delete a garbage file having the incomplete video image content appropriately even when a recording process of a video image content to a recording medium is interrupted, and are useful as a content record terminal, a content record/reproduction system, a content recording method or the like having a function of downloading the video image content from a video image distribution server or a function of exporting the downloaded video image content to a removable medium.

What is claimed is:

1. A content record terminal comprising:
a memory; and
a processor that:
records a content on a non-transitory storage medium;

generates a dummy license in which an expiration time limit is set into a past time, and holds the dummy license in the memory;

writes the dummy license into the medium when the processor records the content on the medium; and deletes the dummy license from the medium and writes a normal license for the content into the medium when the recording of the content on the medium is completed, wherein when the recording of the content on the medium is finished without completing and the processor restarts the recording, if a license recorded on a medium to be restarted is the dummy license, the processor continues the recording of the content on the medium, and thereafter when the recording of the content on the medium is completed, the processor deletes the dummy license recorded on the medium and records the normal license on the medium.

2. The content record terminal according to claim 1, wherein when the recording of the content on the medium is finished without completing and the processor restarts the recording, if a license recorded on a medium to be restarted is not the dummy license, the processor deletes the content recorded on the medium and deletes the license recorded on the medium.

3. The content record terminal according to claim 2, wherein the dummy license, in which the expiration time limit is set into the past time, includes information to identify the content record terminal.

4. The content record terminal according to claim 1, wherein the dummy license, in which the expiration time limit is set into the past time, includes information to identify the content record terminal.

5. The content record terminal according to claim 1, wherein the processor acquires the normal license at least before a start of the recording of the content on the medium and holds the normal license in the memory until being recorded on the medium.

6. A content record terminal comprising:
a memory; and
a processor that:
records a content on a non-transitory storage medium;
generates a dummy license in which an expiration time limit is set into a past time, and holds the dummy license in the memory;
writes the dummy license into the medium when the processor records the content on the medium; and
deletes the dummy license from the medium and writes a normal license for the content into the medium when the recording of the content on the medium is completed, wherein
when the recording of the content on the medium is finished without completing and the processor restarts the recording, if a license recorded on a medium to be restarted is not the dummy license, the processor deletes the content recorded on the medium and deletes the license recorded on the medium.

7. The content record terminal according to claim 6, wherein
the dummy license, in which the expiration time limit is set into the past time, includes information to identify the content record terminal.

8. A content record terminal comprising:
a memory; and
a processor that:
records a content on a non-transitory storage medium;
generates a dummy license in which an expiration time limit is set into a past time, and holds the dummy license in the memory;
writes the dummy license into the medium when the processor records the content on the medium; and
deletes the dummy license from the medium and writes a normal license for the content into the medium when the recording of the content on the medium is completed, wherein
the dummy license, in which the expiration time limit is set into the past time, includes information to identify the content record terminal.

9. A content recording method of a content record terminal which records a content on a medium, the content recording method comprising:
a content write step of recording the content on the medium;
a dummy license generation step of generating a dummy license where an expiration time limit is set into a past time;
a dummy license record step of recording the dummy license on the medium when the content is recorded on the medium;
a license record step of deleting the dummy license recorded on the medium and recording a normal license for the content on the medium, when the recording of the content on the medium is completed; and
a content record continuation step, wherein
when the recording of the content on the medium is finished without completing and the recording is restarted, if a license recorded on a medium to be restarted is the dummy license, the content record continuation step includes continuing the recording of the content on the medium, and thereafter
when the recording of the content on the medium is completed, the content record continuation step includes deleting the dummy license recorded on the medium and recording the normal license on the medium.

10. The content recording method according to claim 9, wherein
when the recording of the content on the medium is finished without completing and the recording is restarted, if the license recorded on the medium to be restarted is not the dummy license, the content record continuation step includes deleting the content and the license recorded on the medium.

11. A non-transitory computer-readable medium having a program stored thereon, wherein the program causes a computer to execute a content recording method of a content record terminal which records a content on a medium, the content recording method comprising:
a content write step of recording the content on the medium;
a dummy license generation step of generating a dummy license where an expiration time limit is set into a past time;
a dummy license record step of recording the dummy license on the medium when the content is recorded on the medium; and
a license record step of deleting the dummy license recorded on the medium and recording a normal license for the content on the medium, when the recording of the content on the medium is completed.

* * * * *